US006993564B2

(12) United States Patent
Whitten, II

(10) Patent No.: US 6,993,564 B2
(45) Date of Patent: Jan. 31, 2006

(54) METHOD OF AUTHORIZING RECEIPT OF INSTANT MESSAGES BY A RECIPIENT USER

(75) Inventor: William B. Whitten, II, Holmdel, NJ (US)

(73) Assignee: AT&T Corp., Bedminster, NJ (US)

(*) Notice: Subject to any disclaimer, the term of this patent is extended or adjusted under 35 U.S.C. 154(b) by 676 days.

(21) Appl. No.: 09/746,042

(22) Filed: Dec. 22, 2000

(65) Prior Publication Data

US 2002/0083136 A1    Jun. 27, 2002

(51) Int. Cl.
    *G06F 15/16* (2006.01)
(52) U.S. Cl. .................. 709/207; 709/205; 709/206
(58) Field of Classification Search ............... 709/205
    See application file for complete search history.

(56) References Cited

U.S. PATENT DOCUMENTS

| 6,301,609 | B1 * | 10/2001 | Aravamudan et al. | ...... 709/207 |
| 6,421,439 | B1 * | 7/2002 | Liffick | ............ 379/211.02 |
| 6,430,289 | B1 * | 8/2002 | Liffick | .................. 370/352 |
| 6,463,460 | B1 * | 10/2002 | Simonoff | ................ 709/203 |
| 6,480,885 | B1 * | 11/2002 | Olivier | .................. 709/207 |
| 6,630,944 | B1 * | 10/2003 | Kakuta et al. | ........... 345/758 |
| 6,678,719 | B1 * | 1/2004 | Stimmel | .................. 709/204 |

OTHER PUBLICATIONS

Kobielus, James—*Network Strategy Report*, "Instant Messaging", pp 1-38.

* cited by examiner

*Primary Examiner*—Marc D. Thompson
*Assistant Examiner*—Joseph Maniwang

(57) ABSTRACT

An instant messaging system allows an instant message recipient to generate a contact list of potential senders of instant messages. This contact list is segmented in to a plurality of sub lists each containing a list of pre-approved potential instant message senders. Each sub list may contain a list of potential instant messengers interested in a particular focus I.e., issue, subject mater, etc.). Some names of potential instant messengers may be common to more than one list. Each individual sub list is by recipient selection subject to certain conditions (i.e., set by a recipient) of acceptance or non-acceptance of instant messages addressed to the recipient. Conditions may encompass items as availability of the recipient, busyness of eh recipient, relations between sender and recipient, cause of the message such as an emergency, and other categories to be set by the recipient.

10 Claims, 4 Drawing Sheets

| Instant Messaging Status → | A B U E | A B U E | A B U E | A B U E | A B U E |
|---|---|---|---|---|---|
| Buddy Categories → | FAMILY | SOCCER | CLUB | CLASS | HOBBY |
| ▽ Buddy Names | | | | | |
| Name 1 | X | | | | X |
| Name 2 | | X | | X | |
| Name 3 | | | X | X | |
| Name 4 | X | X | | | |
| Name 5 | | | | X | X |
| Name 6 | | X | X | X | X |
| ETC | | | | | |
| Name n | | | | | |

| Instant Messaging Status → | A B U <u>E</u> | A <u>B</u> U E | A B <u>U</u> E | <u>A</u> B U E | A B <u>U</u> E |
|---|---|---|---|---|---|
| Buddy Categories → | FAMILY | SOCCER | CLUB | CLASS | HOBBY |
| ▽ | | | | | |
| Buddy Names | | | | | |
| | | | | | |
| Name 1 | X | | | | X |
| Name 2 | | X | | X | |
| Name 3 | | | X | X | |
| Name 4 | X | X | | | |
| Name 5 | | | | X | X |
| Name 6 | | X | X | X | X |
| ETC | | | | | |
| Name n | | | | | |

FIG. 1

METHOD OF AUTHORIZING RECEIPT OF INSTANT MESSAGES BY A RECIPIENT USER

FIELD OF THE INVENTION

This invention relates to instant messaging systems and in particular to on-line contact lists associated with instant messaging. It particularly concerns user control of instant message access to a user through control expressed through a contact list. In particular, the invention operates to provide user control of instant message interruptions during active online sessions.

BACKGROUND OF THE INVENTION

Instant messaging is a form of textual communication between on-line computer users (i.e., computer turned on and connected to network). The message appears on a recipient's screen contemporaneously with it's being sent to the recipient. Authorization for transmitting the message to the recipient depends on whether the transmitter is on a contact list of the recipient or whether the recipient has enabled a block providing for receiving such messages. The contact list is normally maintained by a sender and includes names authorized by potential recipients. Such contact lists are reciprocal and generally cooperatively set up by parties who wish to communicate. Potential recipients may also grant blanket approval for any other transmitting user to add them to their contact list. Similarly a potential recipient may block the receipt of instant messages in general (e.g., by indicating a busy status), wherein no messages are received until the potential recipient removes the block. In other situations, messages are automatically blocked by using the computer off-line or turning it off.

Contact lists often provide a convenient control means for a user to make instant message connections. Such lists are usually activated by the sender user. Contact lists vary for different instant messaging systems. In some instances, contact lists may be created reciprocally by both potential sender and potential recipient. One of the better-known proprietary contact lists is the proprietary "buddy list" provided by America Online. These contact lists allow the general blocking of instant messages and in some instances the blocking of specific individual senders. However, the process requires identity of each individual blocked and the blocking process may prove to be laborious.

There are many instances when more gradations of control of instant messaging access are to be desired. Acceptance of instant messages in general may be undesired at certain times, but receipt of other messages may be desired. At present, there is no particular method of differentiating between desirable messages and undesired messages. This is a problem because in instant messaging all messages sent to a recipient immediately pop up on the recipient's computer screen unannounced, which may rudely interrupt a present activity of the recipient. It would be desirable if a potential recipient of instant messaging could establish gradations between acceptable instant messages and undesirable instant messages.

SUMMARY OF THE INVENTION

An exemplary instant messaging system, embodying the principles of the invention, allows an instant message recipient to generate a contact list of potential senders of instant messages. This contact list is segmented into a plurality of sub lists (i.e., categories) each containing a list of pre-approved potential instant message senders. Each sub list may contain a list of potential instant messengers interested in a particular focus (i.e., issue, subject matter, etc.). Some names of potential instant messengers may be common to more than one list. Each individual sub list is by recipient selection subject to certain conditions (i.e., set by a recipient) of acceptance or non-acceptance of instant messages addressed to the recipient. Conditions may encompass items such as availability of the recipient, busyness of the recipient, relations between sender and recipient, cause of the message such as an emergency, and other status factors to be set by the recipient.

The instant messaging system is flexible and permits users to specify and or modify, at any time, levels of acceptance of incoming messages for any specified particular listener sender. Incoming messages may be acceptable, unacceptable, prioritized, or dealt with in other ways as specified by the potential recipient (i.e. user) in other ways as specified by the intended recipient.

In another exemplary version, a recipient controls a "buddy list" and is permitted to place instant messaging buddies into categories and then to differentially indicate availability status to each category. A contact list is devised that contains multiple lists of names in different categories (e.g., multiple "buddy lists" incorporated into one contact list). In a general control context the potential recipient enables receipt of instant messages to only members of selected ones of the multiple contact lists.

This selection arrangement allows a potential recipient to specify availability to receive instant messages from a plurality of lists by a simple selection by use of a simple pointer (e.g., mouse) to select or activate desired list of senders. Desired senders are easily selected and undesired interruptions to the recipient are determined by non-action of specifying a list for message receipt. The potential recipients may adjust membership lists in each category and select a status for each category.

DESCRIPTION OF THE DRAWING

FIG. 1 is a schematic of a contact list of a recipient embodying the principles of the invention;

DETAILED DESCRIPTION

An exemplary table, such as shown in FIG. 1, illustrates the control processes that a potential recipient of instant messages may use to control access to receipt of these messages. The exemplary table has a matrix structure relating segmented interest categories to contact listed transmitting sources of instant messages. In the exemplary embodiment interest categories "family", "soccer", "club", "class" and "hobby" are matrixed with the individual names #1 through name #6. This table is preferably displayed on a screen of the potential recipient and is designed to be interactively controlled by the recipient. The potential recipient may edit the contents of the table in real time. A list of potential senders comprises a first column. Categories of acceptable senders for message receipt comprise a top row listing. Acceptable message senders for receipt of transmitted instant messages in each category are specified in columns beneath each category heading. Acceptance is indicated by a checking or marking in the matrix by marking intersection of the vertical lists of senders with the specific categories heading.

As shown, various status possibilities are associated with each column heading defining category lists. In the exemplary embodiment several status states include A=available, B=busy-but-on-line, U=unavailable, E=emergency. As is apparent these status possibilities refer to the column of names below. An individual blocked according to one category may be enabled by being listed in another category (which recipient has enabled) and hence able to send an instant message to the recipient. Status indicators may be communicated to the potential sender who knows for example to send an instant message in an emergency; or a fellow class member may be invited to communicate for that reason but discouraged to communicate on matters of a club for example.

Figure 2:
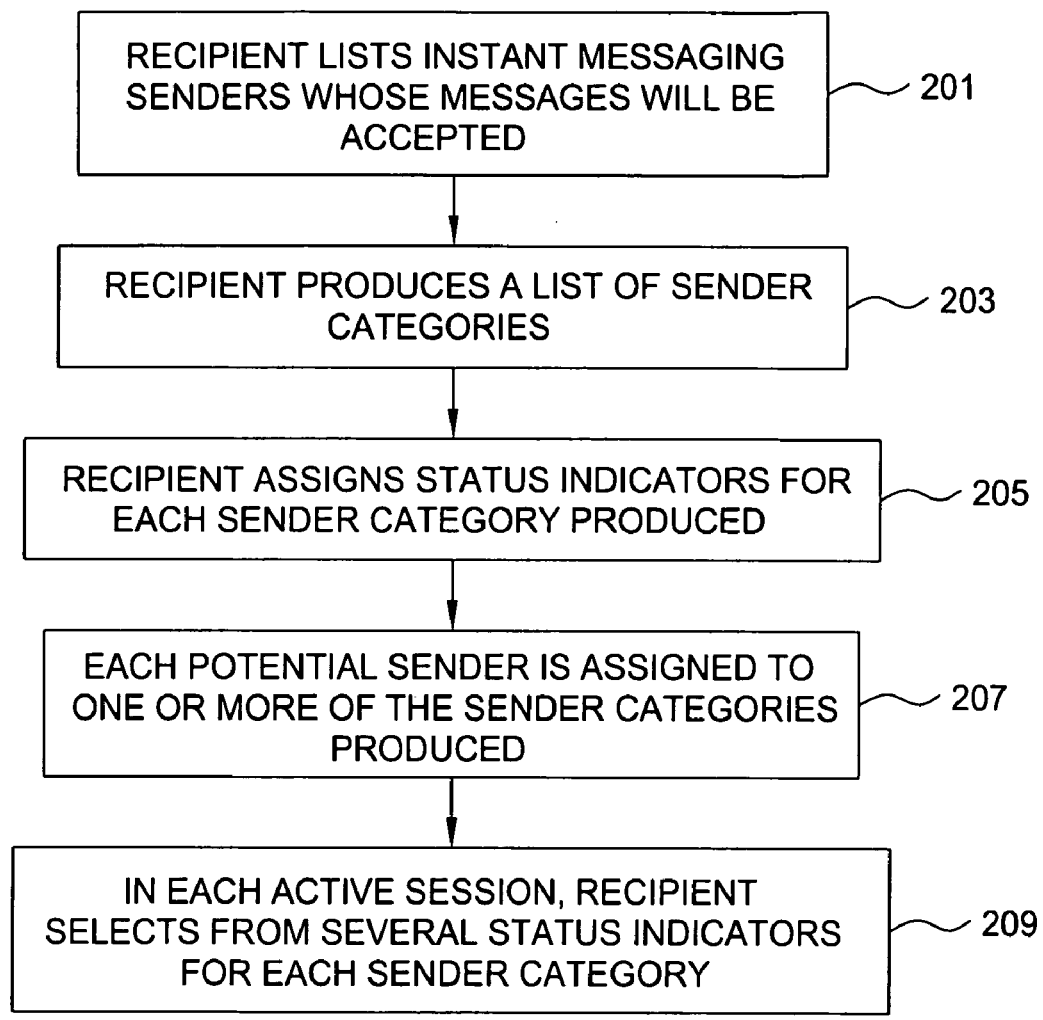
FIGS. 2 and 3 are schematics of instant messaging logical procedures for supporting use of a contact list such as disclosed in the FIG. 1.
Figure 3:
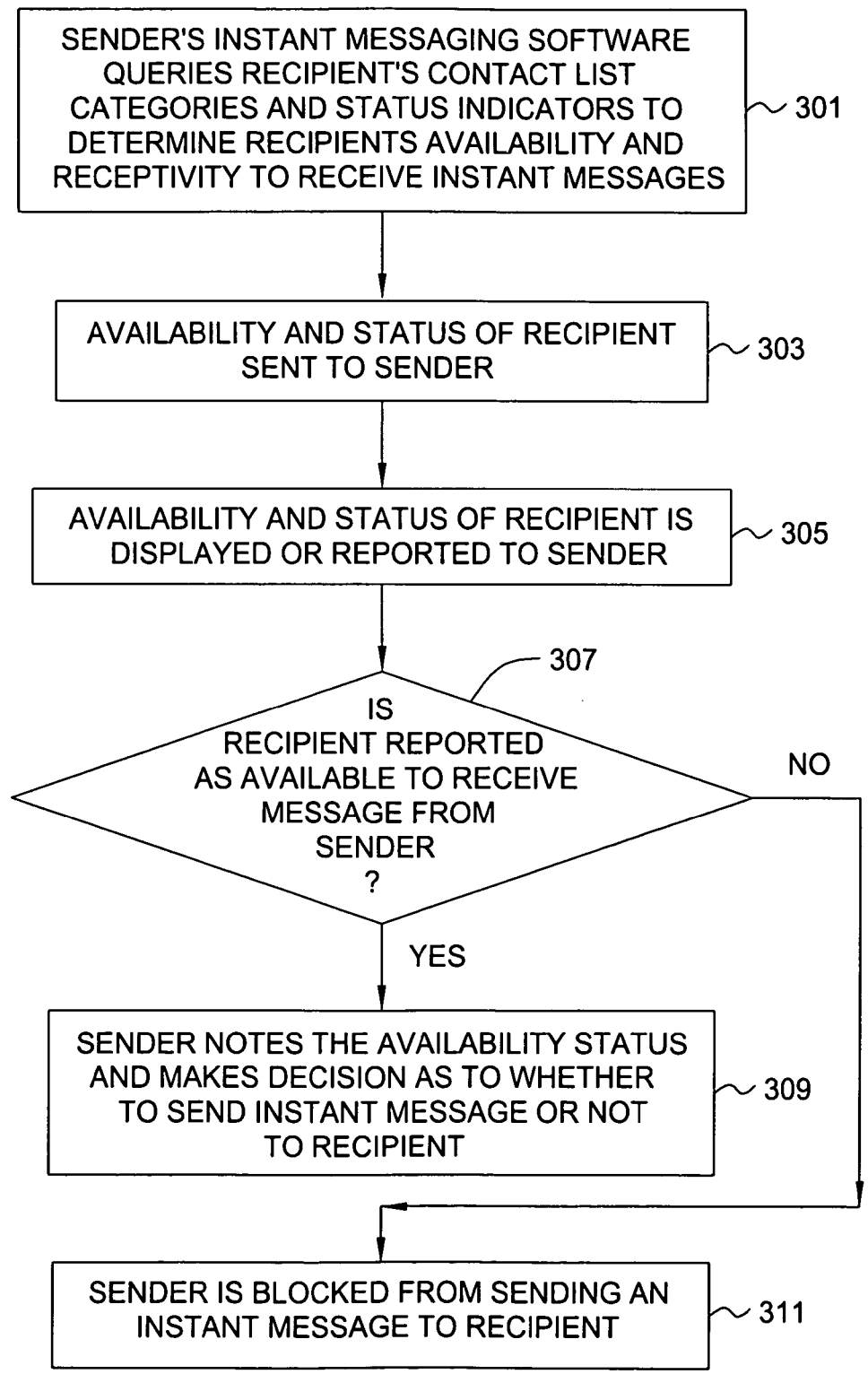

An exemplary flow or logic process by which specific instant messages may be authorized for receipt by a potential recipient is shown in the schematic blocks of FIGS. 2 and 3. In the schematic of FIG. 2 logical procedures, defined in software, which are undertaken by a potential recipient are diagramed. In the block 201 a potential recipient of an instant message prepares a list of senders whose instant messages are controlled by the potential recipient and if properly authorized will be acceptable to receipt by the recipient. The recipient breaks the list into several categories expressing the possible interests of senders as indicated by the block 203. Acceptable senders are listed in each category. Individual senders may be listed in more than one category, as indicated in block 207. Included with each category is a list of status indicators as shown in the block 205. These place restrictions in receiving instant messages from otherwise acceptable senders. For example an otherwise authorized sender may be able to send an instant message to a recipient only in an emergency or for an otherwise specified purpose. In another state, the recipient may grant absolute approval to all potential senders in a selected category. In the beginning of each active session a potential recipient, as indicated in the block 209, selects from categories and the status in each category to indicate acceptable instant messages from particular senders and for specified reasons.

In FIG. 3, the logical procedures of a particular sender are diagramed. Software of the sender undertakes, as indicated by block 301, to query a potential recipient of an instant message as to the contact list categories and the related status indicators. This determines the potential recipients availability and receptivity to receiving instant messages. As indicated in the block 303 the availability of the potential recipient is sent to the inquiring sender. This availability is displayed or reported at the senders PC or other messaging device, as indicated by block 305. Future messaging action depends upon the intended recipients availability for instant messaging as indicated in the decision block 307. If the reply indicated availability to instant messages, the sender can make a choice to send or not to send as indicated in block 309. If the recipient is not available to instant messages, the sender learns that instant, messages are blocked as per block 311.

Figure 4:
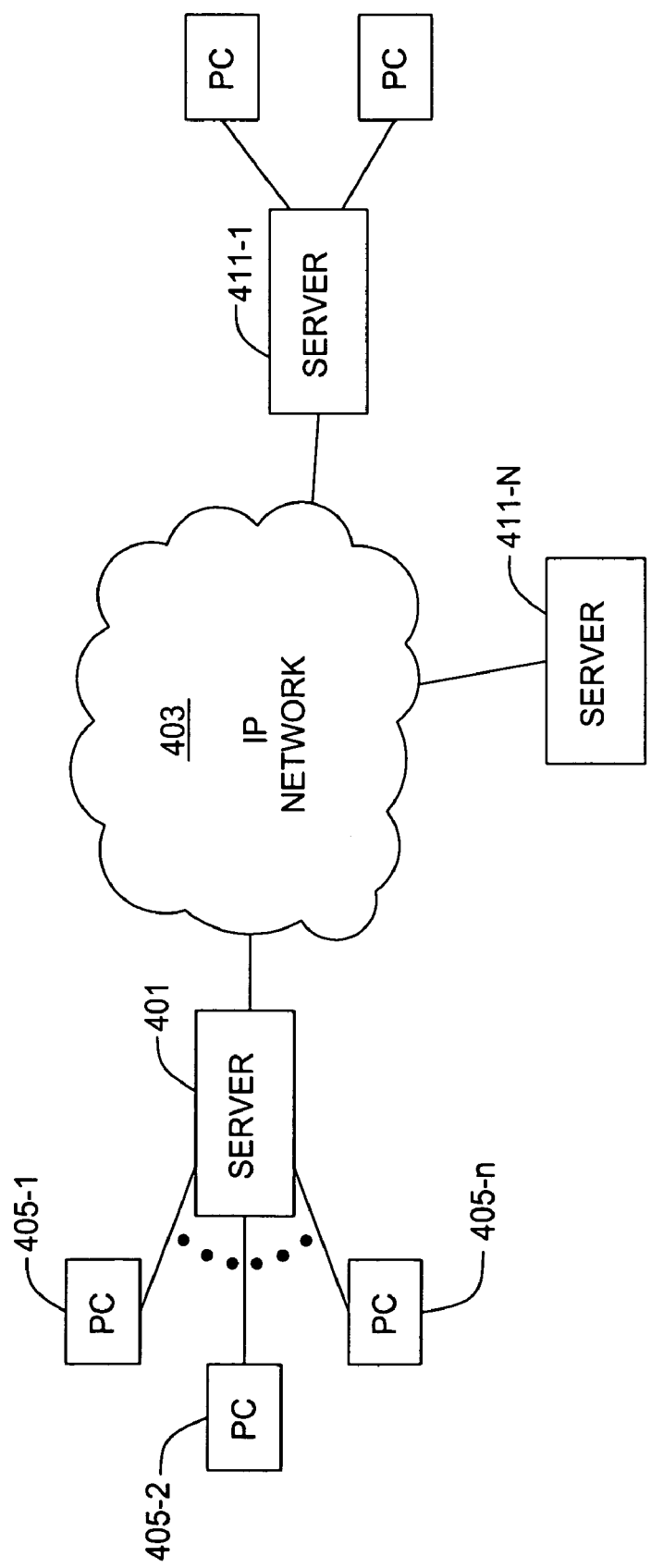
FIG. 4 is an illustrative instant messaging system architecture.

The invention may be supported by any of the standard instant messaging architectures that provide some form of contact-list management. An exemplary instant messaging system is illustrated in the FIG. 4, which shows a typical local Instant Messaging architecture. A plurality of PC stations are shown connected to a central server 401. The central server is shown connected to an IP network 403 and through that network may be connected to other servers 411-1 through 411-N. Server 401 is connected to a plurality of individual PCs 405-1 through 405-N each connected to receive instant messages from the server 301. Other servers connected to the IP network serve local PCs within their service area. The servers may be enabled to manage authentication, contact list management, status of the PCs (i.e., on-line or not) and message routing both locally and through the IP network 303. While local control is illustrated, it is to be understood that decentralized systems having distributed control may also be used to practice the invention. Such systems may involve a series of servers for various functions such as instant messaging, authentication status, etc. In all instances, the presentation to the user is similar to the display illustrated in FIG. 1 and to the user's perception the control instant message access is exercised locally. Many variations of network architectures to practice the invention are possible however, selections of instant message access is uniform in the perspective of the user. Details of such architectures are readily devised by those skilled in the art which however within the spirit of the invention. Scope of the invention is to be defined by the following claims.

What I claim is:

1. In an instant messaging system, a method of controlling instant messaging access, by the steps of:
   generating a recipient user controlled instant messaging contact list;
   segmenting the recipient user controlled instant messaging contact list into a plurality of segmented contact lists;
   selection by the recipient user of various ones of the segmented contact lists and specifying a message category membership in each segmented contact list as a technique of specifying accessibility levels to messages of selected segments of the user controlled instant messaging contact list.

2. The method of claim 1, including a further step of:
   assigning each one of the segmented contact lists a status level of accessibility.

3. The method of claim 2, including a further step of:
   associating a blocking/non-blocking status to selected ones of said segmented contact lists.

4. The method of claim 2, including a further step of:
   associating a priority status to selected ones of said segmented contact lists.

5. The method of claim 2, further including a step of:
   associating a prioritized rational for granting accessibility in each of the selected ones of said segmented contact lists.

6. In an instant messaging system having a capability for sending instant messages and monitoring an on-line status of PCs connected to a managing server/servers, a method for permitting a recipient of instant messages to control accessibility to receive instant messages from a list of potential senders, comprising the steps of:
   preparing a contact list of potential acceptable senders of instant messages;
   segmenting the contact list into a plurality of categories and inserting selected names from the list of potential acceptable senders in selected ones of the plurality of categories;
   enabling selected ones of the plurality of categories for controlling the acceptance of instant messages from senders of the selected ones of the plurality of categories.

7. The method of claim 6 including a further step of:
associating with each category a status further defining instant message acceptability from the listed senders in that category.

8. The method of claim 7, including a step of:
displaying the contact list to a potential recipient of instant messages to allow the potential instant recipient to interact with the contact list in real time.

9. The method of claim 8 further including a step of:
permitting individual names to selectively appear on a plurality of the categories of the contact list.

10. The method of claim 9, including a further step of:
presenting the contact list in a matrix format.

* * * * *